(12) United States Patent
Ropponen

(10) Patent No.: US 11,421,822 B2
(45) Date of Patent: Aug. 23, 2022

(54) APPARATUS AND METHOD FOR DOSING LUBRICANT TO PRESSURIZED AIR TO BE LED TO AN AIR MOTOR

(71) Applicant: PIMATIC OY, Huittinen (FI)

(72) Inventor: Vesa Ropponen, Valo (FI)

(*) Notice: Subject to any disclaimer, the term of this patent is extended or adjusted under 35 U.S.C. 154(b) by 308 days.

(21) Appl. No.: 16/756,624

(22) PCT Filed: Oct. 12, 2018

(86) PCT No.: PCT/FI2018/050738
§ 371 (c)(1),
(2) Date: Apr. 16, 2020

(87) PCT Pub. No.: WO2019/077201
PCT Pub. Date: Apr. 25, 2019

(65) Prior Publication Data
US 2020/0326037 A1    Oct. 15, 2020

(30) Foreign Application Priority Data

Oct. 16, 2017  (FI) ...................................... 20175905

(51) Int. Cl.
*F16N 7/30* (2006.01)
*F16N 7/38* (2006.01)
*F16N 19/00* (2006.01)

(52) U.S. Cl.
CPC ................. *F16N 7/30* (2013.01); *F16N 7/38* (2013.01); *F16N 19/00* (2013.01)

(58) Field of Classification Search
CPC ... F16N 7/30; F16N 7/38; F16N 19/00; F16N 27/00; F16N 13/16
See application file for complete search history.

(56) References Cited

U.S. PATENT DOCUMENTS

| | | | |
|---|---|---|---|
| 1,764,968 A * | 6/1930 | Mendenhall | F16N 19/00 222/389 |
| 3,129,788 A | 4/1964 | Heinz | |
| 3,427,203 A | 2/1969 | Fletcher | |
| 5,427,203 A * | 6/1995 | Anspach, Jr. | F01D 25/18 184/6.26 |
| 6,070,698 A * | 6/2000 | Wells | F16N 7/32 239/366 |
| 2010/0314200 A1 | 12/2010 | Dexter | |
| 2018/0100619 A1* | 4/2018 | Divisi | F16N 7/385 |
| 2018/0100620 A1* | 4/2018 | Holman | F16N 7/385 |

* cited by examiner

*Primary Examiner* — Michael R Mansen
*Assistant Examiner* — Mark K Buse
(74) *Attorney, Agent, or Firm* — Verrill Dana, LLP; Robert L. Hover

(57) ABSTRACT

The invention relates to an apparatus and a method for dosing a lubricant into compressed-air supplied to an air motor. According to the invention, the lubricant is stored in a lubricant storage space (17) from which the lubricant is led, along a lubricant line (19), to a doser (20). The doser (20) doses the lubricant into a dosing line and, therefrom, into a compressed-air line (12) extending to the air motor. The amount of lubricant contained in the storage space (17) is controlled by changing the volume of the storage space (17) by directing the pressure of the compressed-air line (12) to the lubricant storage space (17).

12 Claims, 1 Drawing Sheet

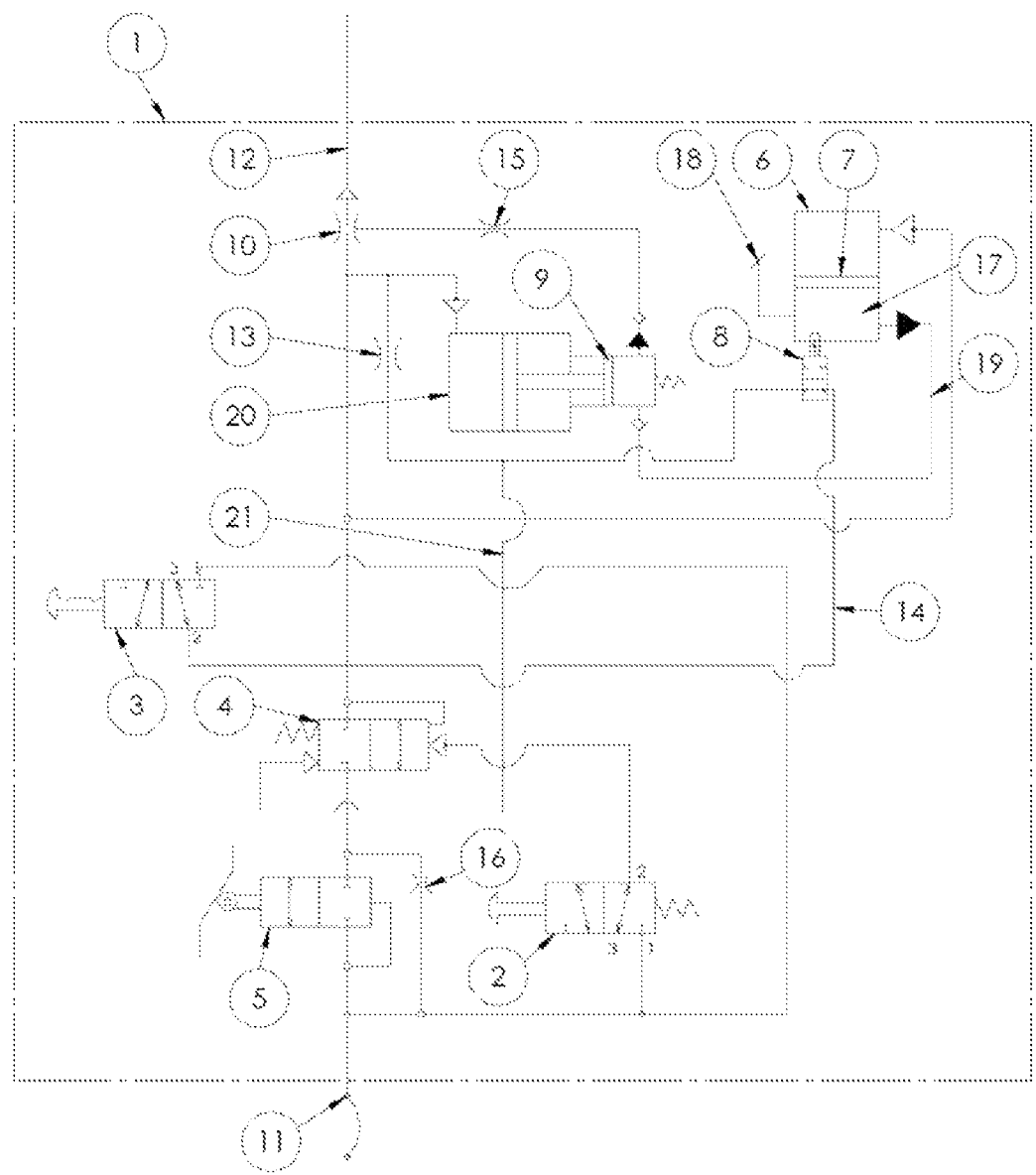

APPARATUS AND METHOD FOR DOSING LUBRICANT TO PRESSURIZED AIR TO BE LED TO AN AIR MOTOR

CROSS-REFERENCE TO RELATED APPLICATIONS

The present application is a United States National Stage of International Application No. PCT/FI2018/050738, filed Oct. 12, 2018, which claims priority to Finnish Patent Application No. 20175905, filed on Oct. 16, 2017, the entire contents of both applications are incorporated in the present application by reference.

TECHNICAL FIELD OF THE INVENTION

The invention relates to an apparatus and a method for dosing a lubricant into compressed air supplied to an air motor, as defined in the preambles of the independent claims disclosed below.

PRIOR ART

The known patent specification WO 2016207489 A1 presents the operation and structure of a so-called pipe saw intended for cutting a pipe. The saw presented in this patent specification is electrically driven. When used in humid or wet conditions, an electrically driven saw may put the user in danger and, in addition, cause the device itself to fail.

It is known that a saw, or some other device, can be powered by hydraulics. If the hydraulic fluid piping breaks up, there is a danger that oil is spread into the environment. This is a problem especially where the saw is used for cutting waterline pipes in groundwater areas, for example.

Compressed air is a good alternative for powering devices. When compressed air is used as a medium for powering a drive motor, a break in the piping does not cause environmental contamination, contrary to when hydraulic oil is used. A preferred alternative as a drive motor is a compressed-air motor having a vaned rotor. An air motor like this is described in GB 388907 A.

It is beneficial for the efficiency and life-span of an air motor if a small amount of a lubricant can be led into the compressed air supplied to the air motor, for lubricating and sealing the vanes, for instance. The lubricant is particularly beneficial if there is any danger of the rotational speed of the motor becoming high.

Lubricant containers do not work well in applications where the position of the device has to be changed, such as when sawing pipes, for example.

It can be difficult for the person using the device to notice that the lubricant is running out.

Starting an air motor involves a danger that the rotational speed becomes too high. This is the case, for example, before the saw blade contacts the material to be cut. This momentary rise in the rotational speed is called racing. During racing, the motor may wear out faster than normal.

A solution presenting an automatic lubricating device for compressed-air starters, wherein the storage space, i.e. the lubricant space, of a lubricant reservoir is reduced by spring power, is known from the U.S. Pat. No. 3,129,788. This is the crucial difference from the solution of the invention presented herein. According to the solution of this U.S patent specification, the spring power is at its highest when the oil reservoir is full and decreases as the reservoir becomes emptier. This does not allow for uniform dosing of the lubricant. As a result, while the reservoir is full, too large an amount of lubricant is conveyed in the air flow, and, while the reservoir is almost empty, too small an amount of lubricant is conveyed in the air flow. An excessive amount of lubricant in pneumatic tools, for example, leads to unnecessary messiness, while an insufficient amount of lubricant may cause device failure. This is why uniform dosing of the lubricant is a desirable feature, especially for pneumatic tools.

OBJECTIVE OF THE INVENTION

The present invention aims at alleviating or even eliminating the above-mentioned problems occurring in the prior art.

In particular, the present invention aims at improving the safety, operability and durability of air motors and any devices driven by them.

A particular objective of the invention is to provide a more effective way of sawing pipes.

BRIEF DESCRIPTION OF THE INVENTION

In order to achieve the above-mentioned objectives, among others, the apparatus and the method according to the invention are characterized in what is set forth in the characterizing part of the accompanying independent claims.

The embodiments and advantages disclosed herein apply, where appropriate, to both the apparatus and the method according to the invention, even though this is not always separately mentioned.

A typical apparatus for dosing a lubricant into compressed air supplied to an air motor according to the invention comprises
  a lubricant reservoir comprising a lubricant storage space,
  a doser for dosing the lubricant into a compressed-air line extending to the air motor,
  a lubricant line for leading the lubricant from the lubricant storage space to the doser,
  a dosing line for leading the lubricant from the doser to the compressed-air line,
  means for changing the volume of the lubricant storage space.

A typical method of dosing a lubricant into compressed air supplied to an air motor according to the invention comprises at the least the following steps of
  storing a lubricant in a lubricant storage space of a lubricant reservoir,
  leading the lubricant, along a lubricant line, from the lubricant storage space to a doser,
  dosing, by the doser, the lubricant into a dosing line and, therefrom, into a compressed-air line extending to the air motor,
  changing the volume of the lubricant storage space and, thereby, controlling the amount of lubricant therein.

Now, it has been invented that the structure of the lubricant reservoir must be designed to avoid operational failure. For a solid reservoir with a constant volume, replacement air intake can be a problem, when the amount of lubricant therein is decreasing, for instance. Traditionally, manipulating the apparatus in different positions causes problems in the lubricant reservoir. Because the structure according to the invention allows the volume of the lubricant reservoir to change, the lubricant is able to unhinderedly flow to an ejector in all situations and reservoir positions.

In an embodiment of the invention, the apparatus comprises means for changing the volume of the lubricant storage space in accordance with the amount of lubricant contained therein. In other words, the volume of the storage space is changed in order to change the amount of lubricant contained therein, that is, in order to discharge the lubricant from the storage space.

The lubricant reservoir with a varying volume can be implemented in a number of ways. As an example, a cylindrical reservoir can be provided with a piston controlling the volume of the storage space and allowing the lubricant to be pressurized as desired. On the other hand, the reservoir may have a structure made of an elastic material, such as rubber or plastic, and separating the compressed air and the lubricant storage space from each other. The entire lubricant reservoir, or the storage space thereof, can be made of the elastic material.

In an embodiment of the invention, the apparatus comprises means for directing the pressure of the compressed-air line to the lubricant reservoir, such as the lubricant storage space. The pressure can be directed, for example, to that side of the piston, or the structure made of the elastic material, which is not contacting the lubricant. Thus, increasing the pressure prevailing in the reservoir causes a discharge of the lubricant from the storage space.

In an embodiment of the invention, the apparatus comprises a doser connected to the compressed-air line and having a dosing piston to which the pressure of the compressed-air line is arranged to be directed. The dosing piston is adapted to direct a pressure, higher than the compressed-air line pressure, to the lubricant, in order to lead it from the doser to the compressed-air line.

In an embodiment of the invention, the lubricant is intensively supplied into the compressed-air right at start-up. This can be done by means of the doser which obtains its operating pressure from the compressed-air line as the main valve is opened.

In an embodiment of the invention, the doser is adapted to supply a single dose of the lubricant when the motor is started.

In an embodiment of the invention, the apparatus comprises a stop valve adapted to shut the compressed-air line off, if desired.

In an embodiment of the invention, the apparatus comprises an indicator valve adapted to sense when the lubricant is running out in the lubricant storage space. In an embodiment, once the lubricant has run out, the indicator valve causes the main valve, and then, the compressed-air line to shut off and, consequently, the air motor to stop.

In an embodiment of the invention, when the lubricant is running out in the storage space, the indicator valve is adapted, if desired, to hinder the flow from the compressed-air line to the stop valve and, thereby, to shut the compressed-air line off.

In order to ensure failure-free operation of the apparatus, the pressure of the lubricant in the lubricant storage space is the same as, or somewhat higher than, the pressure prevailing in the compressed-air pipe. In an embodiment of the invention, the apparatus comprises an ejector provided in the compressed-air line at which the pressure of the compressed-air line decreases. In an embodiment of the invention, the dosing line ends at the ejector, or shortly after it in the flow direction, in order to lead the lubricant from the doser to the compressed-air line by means of the ejector.

It can be said that the ejector sucks the lubricant out of the storage space. The ejector can also be used for dosing the right amount of lubricant into the compressed-air. Because ejectors and their operation principle are known per se, they will not be explained in more detail herein.

In an embodiment of the invention, the structure according to the invention avoids any post-startup racing by providing a specific anti-racing valve in the compressed-air line. It is intended for shutting the compressed-air line off when the apparatus is idling and, thus, for restricting the propagation of the compressed air. A portion of the compressed air may bypass the anti-racing valve along a bypass line where the flow of the compressed air is limited by an idling nozzle. This is how the rotational speed of a saw motor, for example, is limited when the saw is idling. As the actual work begins, as a result of the saw blade moving, for example, the anti-racing valve is opened and allows for a full flow to the air motor.

BRIEF DESCRIPTION OF THE FIGURES

In the following, the invention will be described in more detail with reference to the accompanying schematic drawing wherein FIG. 1 is a schematic view of the operation of the apparatus according to the invention.

DETAILED DESCRIPTION OF THE EXAMPLES OF THE FIGURES

FIG. 1 shows an operating valve/oiler valve structure including a valve housing 1, a start valve 2, a stop valve 3, a main valve 4, an anti-racing valve 5, a lubricant reservoir 6, a lubricant reservoir piston 7, a lubricant storage space 17, a lubricant reservoir filling inlet 18, an indicator valve 8, a closer 20, a dosing piston 9, an ejector 10, a connection line 11 for leading compressed air to the apparatus, a compressed-air line 12 extending to an air motor, an indicator valve nozzle 13, control-air lines 14,21, a lubricant-flow restricting nozzle 15, an idling nozzle 16, lubricant flow lines 19. The lubricant flow and the air flow are represented by black-headed arrows and white-headed arrows, respectively.

The following describes the invention and the operation of the apparatus according to the invention while it is coupled to a pipe saw for cutting pipes. The apparatus has several other applications.

The pipe saw (not shown) is powered by compressed air flowing in from the end of a compressed-air line 12 shown at the top edge of the FIGURE. The apparatus according to the invention provides the pipe saw, or any device attached thereto, with at least the following functions: Start, Stop, Anti-racing, Stopping when lubricant runs out.

The apparatus in operational when the lubricant storage space 17 is at least partly filled and the compressed air is connected to the inlet line 11. Once any preparations for the sawing have been completed, the saw has been locked in a so-called basic position and fastened to the pipe to be cut, the user pulls the button of the stop valve 3 to an outer position, i.e. closes the stop valve.

The apparatus does not start yet but it is started by pushing the button of the start valve 2, i.e. by opening the start valve which is spring-returned. The start activates the main valve 4 which is kept open by the pressure present in the channel system after the main valve, i.e. in the compressed-air line 12, the compressed air being able to be discharged, through the ejector 10, from the top of the FIGURE to the air motor. At the same time, pressure is led from the compressed-air line 12 to the lubricant reservoir 6. Then, lubricant is pressurized by the piston 7 provided in the lubricant reservoir 6. At the same time, as the compressed-air line 12 also provides a control pressure to the piston 9 of the doser, it doses, through the ejector 10, a suitable amount of lubricant into the pressure line 12 extending to the air motor. In the FIGURE, check valves are drawn on both sides of the doser, only allowing the lubricant to flow away from the storage space. At the same time, a small amount of compressed air starts to flow, through the indicator valve nozzle 13, both to the main valve 4 for closing it, and, therefrom, to the stop valve 3 and out of there through its outlet. If the oil runs out in the storage space 17, the indicator valve 8 shuts off the air flow through itself, with the result that the pressure starts to rise in the control line 21 intended for closing the main valve 4. This closes the main valve 4. In order to continue working, the user must fill up the lubricant storage space 17 and restart the apparatus.

After the start, the anti-racing valve 5 provided in the compressed-air line is closed. In the bypass line thereof, the idling nozzle 16 restricts the compressed-air flow directed to the air motor. Therefore, the rotational speed of the motor is limited while it is idling. As the actual work begins and the saw blade is pushed against the pipe to be cut, the movement of the saw opens the anti-racing valve 5, allowing for a full flow to the air motor. Once the work is completed, the user fully depresses the button of the stop valve 3, thereby closing the main valve 4 and stopping the apparatus. The button of the stop valve 3 stays fully depressed.

The described embodiments are not intended to restrict the invention but the scope of protection of the invention is defined by the independent claims. The dependent claims disclose a few preferred embodiments of the invention.

The invention claimed is:

1. An apparatus for dosing a lubricant into compressed air supplied to an air motor, the apparatus comprising:
   a lubricant reservoir comprising a lubricant storage space,
   a doser for dosing the lubricant into a compressed-air line extending to the air motor,
   a lubricant line for leading the lubricant from the lubricant storage space to the doser,
   a dosing line for leading the lubricant from the doser to the compressed-air line,
   means for changing the volume of the lubricant storage space, wherein the means for changing the volume of the lubricant storage space comprise a piston that is controlled by the pressure of the compressed-air line directed to the lubricant reservoir.

2. The apparatus of claim 1, wherein the doser has a dosing piston, and wherein the pressure of the compressed-air line being arranged to be directed to the dosing piston which is adapted to direct a pressure, higher than the compressed-air line pressure, to the lubricant, in order to lead it from the doser to the compressed-air line.

3. The apparatus of claim 1, wherein the doser is adapted to supply a single dose of the lubricant when the motor is started.

4. The apparatus of claim 1, further comprising a stop valve adapted to shut off the compressed-air line.

5. The apparatus of claim 4, wherein when the lubricant is running out in the lubricant storage space, the indicator valve is adapted to hinder the flow from the compressed-air line to the stop valve and, thus, to shut the compressed-air line off.

6. The apparatus of claim 1, further comprising an indicator valve adapted to sense when the lubricant is running out in the lubricant storage space.

7. The apparatus of claim 1, further comprising an ejector provided in the compressed-air line.

8. The apparatus of claim 7, wherein the dosing line ends at the ejector, for leading the lubricant from the doser to the compressed-air line.

9. The apparatus of claim 1, further comprising an anti-racing valve, adapted to restrict the propagation of the compressed air in the compressed-air line when the apparatus is idling, wherein the anti-racing valve is provided in the compressed-air line.

10. A method of dosing a lubricant into compressed air supplied to an air motor, the method comprising:
    storing a lubricant in a lubricant storage space of a lubricant reservoir,
    leading the lubricant, along a lubricant line, from the lubricant storage space to a doser,
    dosing, by the doser, the lubricant into a dosing line and, therefrom, into a compressed-air line extending to the air motor,
    changing the volume of the lubricant storage space by directing the pressure of the compressed-air line to the lubricant storage space and, thereby, controlling the amount of lubricant contained therein, wherein the pressure of the compressed air line is directed to the lubricant storage space by a piston placed in the lubricant reservoir.

11. The method of claim 10, wherein the pressure of the compressed-air line is reduced by an ejector provided in the compressed-air line.

12. The method of claim 11, wherein the lubricant is led from the dosing line to the compressed-air line by means of the ejector.

* * * * *